(12) United States Patent
Zhou et al.

(10) Patent No.: US 12,607,649 B2
(45) Date of Patent: Apr. 21, 2026

(54) METHOD AND APPARATUS FOR ADAPTIVE COMPENSATION OF OBJECT INCLINATION

(71) Applicant: Alps Alpine Co., Ltd., Tokyo (JP)

(72) Inventors: Mingda Zhou, Auburn Hills, MI (US); Chengchun Fang, Rochester Hills, MI (US); Jahiz Ahmed, Rochester Hills, MI (US); Zachary Denny, South Lyon, MI (US); Stone Maguire, Clarkston, MI (US)

(73) Assignee: Alps Alpine Co., Ltd. (JP)

( * ) Notice: Subject to any disclaimer, the term of this patent is extended or adjusted under 35 U.S.C. 154(b) by 427 days.

(21) Appl. No.: 18/316,223

(22) Filed: May 11, 2023

(65) Prior Publication Data

US 2024/0377432 A1     Nov. 14, 2024

(51) Int. Cl.
*G01P 15/18*          (2013.01)

(52) U.S. Cl.
CPC ..................................... *G01P 15/18* (2013.01)

(58) Field of Classification Search
CPC ..................................... G01P 15/18; G01C 9/02
See application file for complete search history.

(56) References Cited

U.S. PATENT DOCUMENTS

| | | | |
|---|---|---|---|
| 8,374,817 B2 | 2/2013 | Boeve et al. | |
| 9,599,633 B2 | 3/2017 | McKown | |
| 10,495,664 B2 | 12/2019 | Stewart et al. | |
| 10,624,522 B1 * | 4/2020 | Chan ..................... | G08B 21/18 |
| 2018/0186531 A1 * | 7/2018 | McBride ............. | E05B 65/0075 |
| 2019/0292833 A1 * | 9/2019 | Lamm ..................... | E05F 15/70 |
| 2020/0064370 A1 | 2/2020 | Hergesheimer et al. | |
| 2021/0056492 A1 | 2/2021 | Zass | |
| 2022/0128352 A1 | 4/2022 | Binder | |
| 2022/0144339 A1 | 5/2022 | Lavoie et al. | |

FOREIGN PATENT DOCUMENTS

JP          2003329705 A     11/2003

OTHER PUBLICATIONS

International Search Report with Written Opinion issued in the corresponding International Application No. PCT/US24/17082; mailed on May 15, 2024 (total 8 pages).

* cited by examiner

*Primary Examiner* — Catherine T. Rastovski
*Assistant Examiner* — Cynthia L Davis
(74) *Attorney, Agent, or Firm* — Harness, Dickey & Pierce, P.L.C.

(57)          ABSTRACT

A sensing system includes a position sensor configured to generate sensor data indicating a position of an object on a surface, the object having a first component and a second component. The first component is moveable relative to the second component. An inclination angle calculation module is configured to receive the sensor data, calculate an impact of stationary gravitational acceleration on the object, and, using the calculated impact of stationary gravitational acceleration on the object, calculate at least one of a long-term inclination angle of the object, a short-term inclination of the object, and an inclination angle of the first component relative to the second component. The long-term inclination indicates a stationary position of the object for a predetermined threshold amount of time. The short-term inclination corresponds to a period shorter than the predetermined threshold amount of time.

20 Claims, 3 Drawing Sheets

METHOD AND APPARATUS FOR ADAPTIVE COMPENSATION OF OBJECT INCLINATION

FIELD

The present disclosure relates to systems for sensing orientation of an object.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

One or more sensors may be used to determine an orientation of an object. For example, the object may include an accelerometer configured to sense an inclination angle of the object relative to the ground or another object. In other examples the object may be comprised of multiple components configured to move relative to one another. In these examples, one or more accelerometers may be used to sense an orientation of one component relative to another component of the same object.

SUMMARY

A sensing system includes a position sensor configured to generate sensor data indicating a position of an object on a surface, the object having a first component and a second component. The first component is moveable relative to the second component. An inclination angle calculation module is configured to receive the sensor data, calculate an impact of stationary gravitational acceleration on the object, and, using the calculated impact of stationary gravitational acceleration on the object, calculate at least one of a long-term inclination angle of the object, a short-term inclination of the object, and an inclination angle of the first component relative to the second component. The long-term inclination indicates a stationary position of the object for a predetermined threshold amount of time. The short-term inclination corresponds to a period shorter than the predetermined threshold amount of time.

In other features, the position sensor is an accelerometer. The sensing system includes only a single accelerometer. The sensing system further includes a level detection sensor configured to sense a level of material contained within the second component of the object. The sensing system further includes a communication interface configured to transmit a signal indicating the level of material contained within the object. The communication interface is configured to selectively not transmit the signal based on the inclination angle of the first component relative to the second component.

In other features, the second component is a container and the second component is a lid of the container. The container is a trash container. The object is a vehicle, the second component is a body of the vehicle, and the first component is a door, liftgate, or tailgate of the vehicle. The sensing system further includes a motion filter configured to filter out sensor data corresponding to measurements taken by the position sensor during movement of the object.

A method includes generating sensor data indicating a position of an object on a surface, the object having a first component and a second component. The first component is moveable relative to the second component. The method further includes calculating an impact of stationary gravitational acceleration on the object and, using the calculated impact of stationary gravitational acceleration on the object, calculating at least one of a long-term inclination of the object, a short-term inclination of the object, and an inclination angle of the first component relative to the second component. The long-term inclination indicates a stationary position of the object for a predetermined threshold amount of time. The short-term inclination corresponds to a period shorter than the predetermined threshold amount of time.

In other features, the method further includes generating the sensor data using an accelerometer. The method further includes generating the sensor data using only a single accelerometer. The method further includes sensing a level of material contained within the second component of the object. The method further includes transmitting a signal indicating the level of material contained within the object. The method further includes selectively not transmitting the signal based on the inclination angle of the first component relative to the second component.

In other features, the second component is a container and the second component is a lid of the container. The container is a trash container. The object is a vehicle, the second component is a body of the vehicle, and the first component is a door, liftgate, or tailgate of the vehicle. The method further includes filtering out sensor data corresponding to measurements taken during movement of the object.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A sensor such as an accelerometer may be used to sense an orientation (e.g., inclination angle or tilt) of an object relative to a surface, such as the ground. A single sensor mounted on a first (e.g., moveable) component of the object may be configured to sense an orientation of the moveable component relative to a second (e.g., fixed) component of the object. For example, if the object is assumed to be located on a relatively flat surface (e.g., the ground) with a known inclination angle, the sensed orientation of the first component relative to the second component can be readily obtained. In other words, the inclination angle of the first component relative to the fixed component can be readily obtained from the sensed inclination of the first component relative to the ground.

Conversely, if the inclination angle of the object (e.g., the second component) is unknown or varies, the inclination angle of the first component relative to the ground may not accurately correspond to the inclination angle of the first component to the second component. For example, if the object is moved from a first location having a first inclination angle (e.g., a location having a relatively flat surface) to a second location having a second inclination angle (e.g., a location having a sloped surface), the inclination angle of the first component to the surface changes regardless of whether the first component is moved relative to the second component. In this example, the inclination angle of the first component to the surface may not accurately correspond to the inclination angle of the first component to the second component.

Sensing systems and methods according to the present disclosure are configured to determine an inclination angle of an object relative to a supporting surface and adaptively compensate for changes in a slope of the surface. For example, for an object including a first component that is moveable relative to a second component supported on a surface, the sensing system is configured to determine when the object has been moved, compensate for any changes in the inclination angle of the object caused by changes in the slope of the surface, and accurately determine an inclination angle of the first component relative to the second component.

Figure 1B:
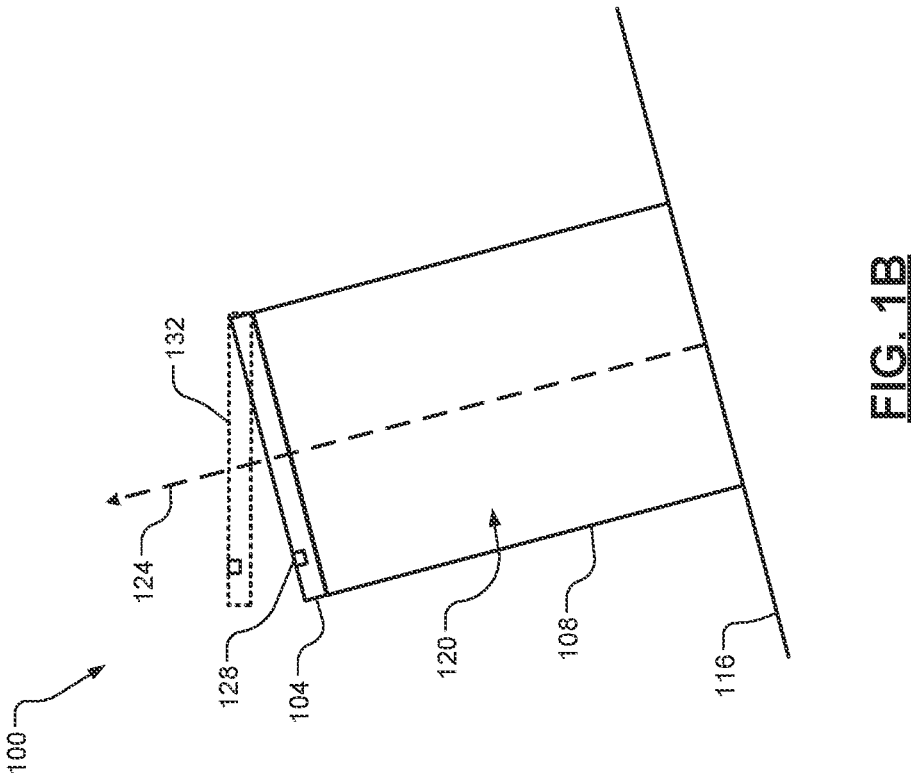
FIGS. 1A and 1B illustrate an object including a sensor module according to the present disclosure.
Figure 1A:
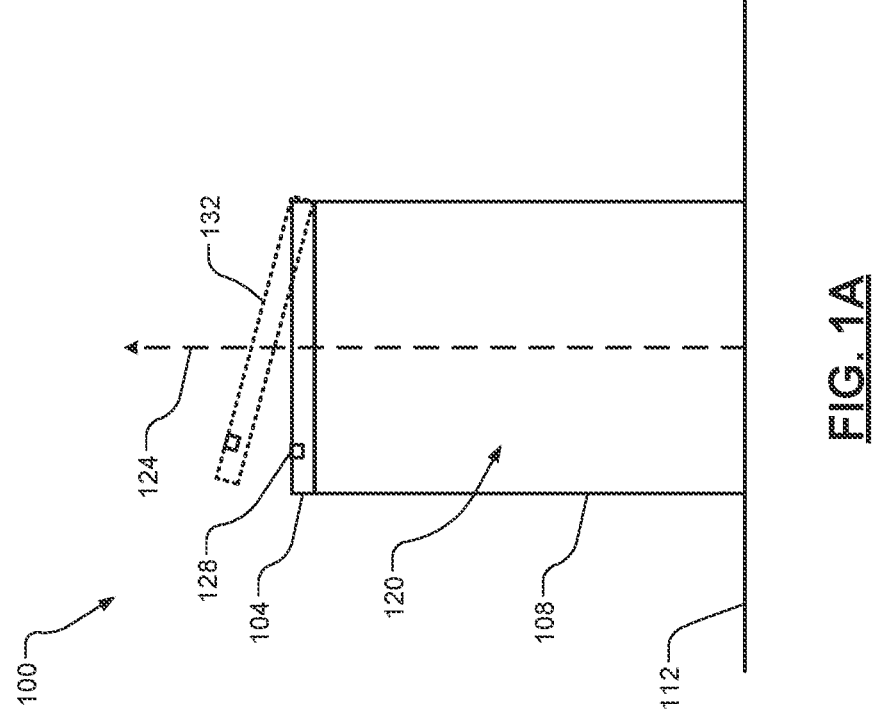

Referring now to FIGS. 1A and 1B, an example object 100 having a first component 104 and a second component 108 is shown arranged on different supporting surfaces 112 and 116. The first component 104 is moveable relative to the second component 108. In one example, the object 100 is a container such as a trash bin, the first component 104 is a lid of the container, and the second component is a container portion (i.e., the portion of the container defining an interior volume 120). In another example, the object 100 is a vehicle, the first component 104 is a liftgate, tailgate, etc. of the vehicle, and the second component 108 is a body of the vehicle. Other examples of the object 100 include, but are not limited to, a storage container, a portable storage unit, a shipping container or package, etc.

As shown in FIG. 1A, the object 100 is shown arranged on the surface 112, which is generally flat. In this example, the object 100 is in a "normal" resting position. For example, a vertical axis 124 of the second component 104 is perpendicular to the surface 112 (i.e., the vertical axis 124 is parallel to a line normal to the surface 112).

The object 100 includes one or more sensors configured to sense various conditions or characteristics of the object 100. For simplicity, the sensors are shown as a single sensor module or circuit 128 arranged on the first component 104. In other examples, the sensor module 120 and related components may be arranged in one or multiple other locations on the object 100, such as on the second component 108. In some examples, the sensor module 128 includes a proximity or level detection sensor (e.g., an infra-red sensor) configured to detect a height or level of material within the second component 108. For example, the level detection sensor is configured to detect a level of waste within the second component 108.

However, if the first component 104 (i.e., the lid) is partially open (as shown in dashed lines at 132), the sensor module 128 is inclined relative to the second component 108. For example, the lid may be opened briefly, or overfilling the container may force the lid into an open position. In this situation, the level detection sensor is misaligned and is unable to accurately detect the level of the material within the container.

Accordingly, the sensor module 128 includes a position sensor (e.g., an accelerometer) to determine when the first component 104 is inclined relative to the second component 108, such as when the lid is briefly opened or otherwise forced into an open position (e.g., forced open by overfilling, left in a completely open position, etc.). When the first component 104 is inclined, the sensor module 128 disregards sensor measurements received from the level sensor. In other words, the sensor module 128 is configured to recognize when the position of the first component 104 causes misalignment of the level sensor. In some examples, the sensor module 128 is configured to transmit a signal to a user indicating that the lid is open and/or that the level sensor is not able to accurately sense the level of the material within the second component 108.

As shown in FIG. 1B, the object 100 is shown arranged on the surface 116, which is sloped. In this example, the object 100 is not inclined relative to the surface 116, and the vertical axis 124 of the second component 108 is still perpendicular to the surface 116. However, since the surface 116 itself is sloped, sensor measurements output from the sensor module 128 indicate that the first component 104 is inclined relative to the surface 116. In other words, although the first component 104 is not inclined relative to the second component 108 (i.e., the lid is not open), the measurements output from the sensor module 128 nonetheless indicate that the first component 104 is in an inclined position.

Conversely, when the first component 104 is open as shown at 132, the first component 104 is not inclined relative to the surface 116. In other words, due to the slope of the surface 116, the measurements from the sensor module 128 indicate that the first component 104 is in a generally flat position despite the lid actually being partially open and inclined relative to the second component 108.

The sensor module 128 according to the present disclosure is configured to, using only a single position sensor or accelerometer, determine when the object 100 is on a sloped surface and accurately detect whether the first component 104 is inclined relative to the second component 108 despite the object 100 being on the sloped surface 116. For example, the sensor module 128 is configured to determine long-term inclination of the second component 108. The long-term inclination corresponds to an inclination angle of the object 100 itself due to being supported on a particular surface (e.g., either the flat surface 112 or the sloped surface 116).

As one example, to determine long-term inclination, the sensor module 128 determines whether an inclination angle of the object 100 has been constant for at least a predetermined threshold amount of time (e.g., one day, two days, etc.). Inclination angle calculations that are generally constant/unchanged for greater than the threshold amount of time are considered long-term inclination. Conversely, inclination angle calculations having a generally short duration less than the threshold amount of time are considered short-term inclination. For example, short-term inclination may be caused by changing the location of the object 100, opening and closing the lid, etc.

Subsequent to determining the long-term inclination, the sensor module 128 is configured to distinguish between the long-term inclination of the object 100 and an inclination angle of the first component 104 relative to the second component 108. In other words, the sensor module 128 is configured to compensate for inclination angle of the second component 108 to the surface to accurately determine the inclination angle of the first component 104 to the second component 108.

Figures 2A, 2B:
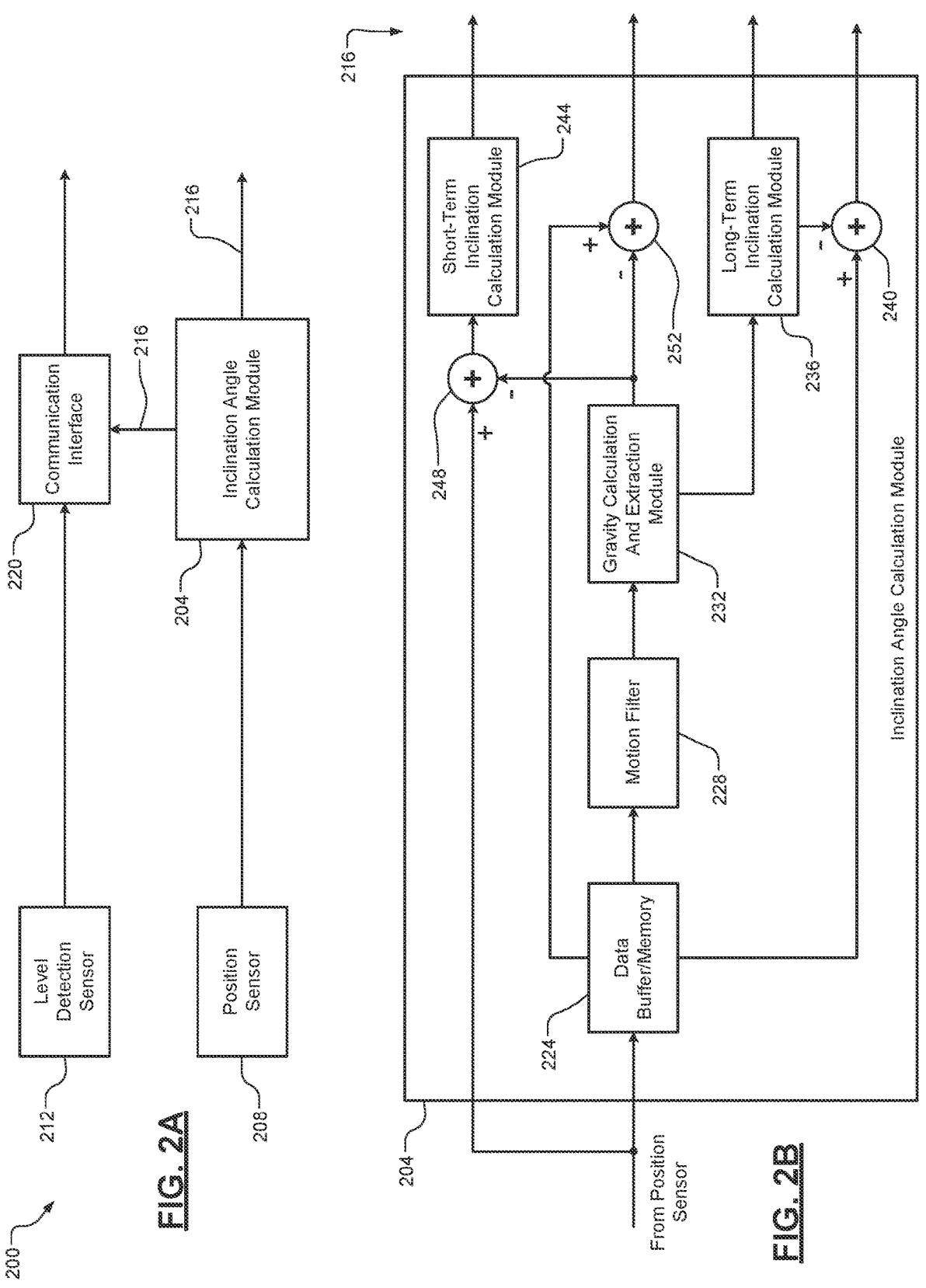
FIG. 2A is a functional block diagram of a sensor module according to the present disclosure
FIG. 2B is a functional block diagram of an inclination angle calculation module according to the present disclosure.

Referring now to FIGS. 2A and 2B, an example sensing system including a sensor module 200 according to the present disclosure is shown. The sensor module 200 includes an inclination angle calculation module 204, a position sensor 208, and an optional level detection sensor 212. For example, as described above, the sensor module 200 is comprised of one or more circuits or other hardware modules (e.g., an integrated circuit, printed circuit board, etc.) arranged in one or more mounting locations on the object 100. In one example, both the position sensor 208 and the level detection sensor 212 are arranged on the sensor module 200. In another example, one or both of the position sensor 208 and the level detection sensor 212 are arranged external to the sensor module 200. For example, the position sensor 208 is arranged on the sensor module 200 while the level detection sensor 212 is arranged in a different location (e.g., a position on the lid of the container optimal for detecting the level of the material within the container).

The inclination angle calculation module 204 according to the present disclosure is configured to determine (e.g., calculate) when an (e.g., the object 100) is on a sloped surface and accurately detect whether the first component 104 is inclined relative to the second component 108 (as described above in FIGS. 1A and 1B and as described below in more detail). For example, the inclination angle calculation module 204 is configured to determine long-term inclination of the object 100, distinguish between the long-term inclination and any short-term inclination of the object 100, and determine an inclination angle of the first component 104 relative to the second component 108 based on the long-term inclination.

The inclination angle calculation module 204 generates one or more output signals 216 based on the above calculations. For example, the output signals 216 include various signal indicating the long-term inclination, the short-term inclination, the inclination angle of the first component 104 relative to the second component 108, etc. In some examples, one or more of the output signals 216 is provided to a communication interface 220. The communication interface 220 includes circuitry configured to transmit a signal from the sensor module 220, such as Bluetooth, Wi-Fi, or other wireless communication circuitry. The signal transmitted from the communication interface 220 may include, but is not limited to, an indication of a level of material contained within the object 100 (e.g., as determined by the level detection sensor 212), an indication of inclination angles of the first component 104 and the second component (e.g., an indication that the lid is open), etc. In some examples the communication interface 220 may selectively not transmit the indication of the level of the material if the inclination angle of the first component 104 indicates that the lid is open or otherwise not in a position suitable for sensing the level of the material.

As one example, the inclination angle calculation module 204 models a sensor measurement A (e.g., an acceleration measurement) as $A = A_L + A_S + a_I$, where $A_L$ is long-term inclination, $A_S$ is short-term inclination, and $a_I$ is a current acceleration (i.e., instantaneous acceleration caused by ongoing movement of the object 100). In some examples, the model of sensor measurement A includes and corrects for measurement noise. In some examples, the long-term inclination $A_L$ is based on a calculation of gravity (i.e., long-term gravitational acceleration) as described below in more detail. For any given sensor measurement of the acceleration A, the inclination angle calculation module 204 is configured to extract the long-term inclination, extract gravity from the short-term inclination, extract gravity from the measurement A, etc. For example, the sensor measurement A with the long-term inclination removed is indicative of the inclination angle of the first component 104 to the second component 108.

FIG. 2B shows an example implementation of the inclination angle calculation module 204 in more detail. For example, the inclination angle calculation module 204 may be implemented using circuitry, such as a processor configured to execute instructions corresponding to functions of the inclination angle calculation module 204 describe below. Each of the components off the inclination angle calculation module 204 may correspond to separate processors or circuits, instructions executed by the inclination angle calculation module 204, etc.

The inclination angle calculation module 204 includes a data buffer/memory 224 configured to receive sensor data from the position sensor 208. For example, the sensor data includes raw measurement data (e.g., acceleration data in x, y, and/or z directions as sensed by an accelerometer) indicating a position of the object 100. The data buffer/memory 224 may store a predetermined number of samples of the position sensor 208 (e.g., sensor data for a predetermined period of time). In one example, the data buffer/memory 224 has a first in first out configuration.

A motion filter 228 is configured to filter out sensor data corresponding to measurements taken by the position sensor 208 during movement of the object 100 (e.g., either movement of the entire object 100 or the first component 104). For example, sensor data indicating dynamic acceleration (i.e., movement), such as sensor data exceeding a movement threshold, is filtered out. The filtered sensor data is provided to a gravity calculation and extraction (GCE) module 232.

The GCE module 232 is configured to calculate/extract gravity from the sensor data. As used herein in the context of the sensor data, "gravity" refers to the impact of static or stationary gravitational acceleration on the object 100 and the sensor data. When the object 100 is stationary (whether on a relatively flat surface or a sloped surface), the gravitational acceleration will be relatively constant. In other words, although a slope of the surface may cause the impact of gravitational acceleration to vary, the gravitational acceleration will remain relatively constant for as long as the object 100 is in a same location on the surface. Accordingly, if the object 100 is not moving, the sensor data with the gravitational acceleration extracted/removed corresponds to long-term inclination of the object 100. An output of the GCE module 232 corresponds to a long-term gravity calculation (i.e., a long-term impact of stationary gravitational acceleration on the position sensor 208 resulting from the object 100 being stationary for a predetermined period of time).

The calculated gravity is provided to a long-term inclination calculation (LTIC) module 236. For example, the LTIC module 236 is configured to calculate an actual inclination angle of the object 100 on the surface 112/116 based on the calculated gravity. An output of the LTIC module 236 (e.g., the long-term inclination angle) is provided to a summer 240, which subtracts the long-term inclination angle from the sensor data. An output of the summer 240 corresponds to the sensor data with the long-term inclination angle extracted. Accordingly, if the first component 104 is inclined relative to the second component

108, the output of the summer 240 indicates the inclination angle of the first component 104 relative to the second component 108.

Conversely, a short-term inclination calculation (STIC) module 244 is configured to generate an output that indicates the short-term inclination of the object 100. For example, the sensor data and the calculated gravity are provided to a summer 248, which is configured to subtract the calculated gravity from the sensor data. Accordingly, the output of the STIC module 244 is indicative of a difference between the sensor data (e.g., a current position sensed by the position sensor 208) and the calculated gravity (e.g., a previously-calculated long-term position sensed by the position sensor 208). In other words, since the sensor data is provided directly to the summer 248 (i.e., without passing through the data buffer/memory 224), the STIC module 244 performs calculations based on real-time sensor data indicating a current position of the object 100.

A summer 252 receives the sensor data from the data buffer/memory 224 and the calculated gravity from the GCE module 232 and subtracts the calculated gravity from the sensor data. Accordingly, an output of the summer 252 corresponds to the sensor data with the long-term gravitational acceleration impact removed.

In this manner, the inclination angle calculation module 204 is configured to generate one or more outputs indicative of the inclination angle of the object 100 and the inclination angle of the first component 104 relative to the second component 108.

Figures 3, 4:
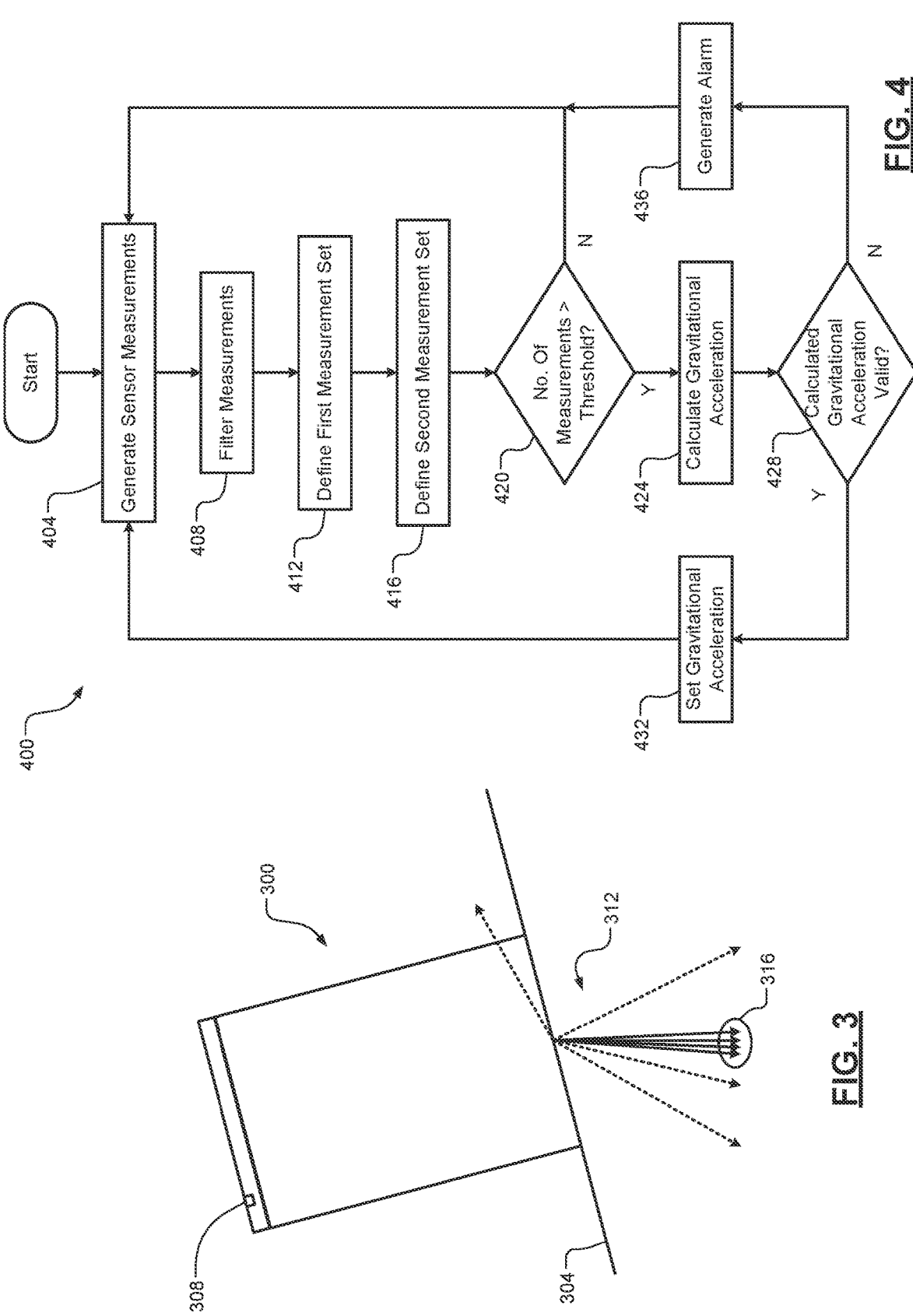
FIG. 3 illustrates sensor measurements of long-term, gravitational acceleration of a stationary object according to the present disclosure.
FIG. 4 illustrates steps of an example method for obtaining gravitational acceleration of a stationary object according to the present disclosure.

Referring now to FIG. 3, an example calculation performed by the GCE module 232 for an object 300 (e.g., a stationary object) supported on a surface 304 is described. A sensor module 308 is configured to generate a plurality of sensor measurements as described above. Arrows 312 show respective gravitational acceleration calculations for the different sensor measurements. The sensor module 308 is configured to identify which sensor measurements correspond to long-term, stationary gravitational acceleration. For example, sensor measurements that indicate a stationary gravitational acceleration within a region 316 are shown as solid arrows. Conversely, sensor measurements that indicate a gravitational acceleration outside of the region 316 are shown as dashed arrows.

In other words, sensor measurements indicating a gravitational acceleration that is within the region 316 for at least a predetermined threshold amount of time (e.g., one day, two days, etc.) is indicative of long-term inclination of a stationary object. Conversely, sensor measurements indicating a gravitational acceleration outside of the region 316 are indicative of short-term inclination, movement of the object 300, etc. Accordingly, sensor measurements corresponding to gravitational acceleration outside of the region 316 are not considered by the sensor module 308 when calculating long-term inclination.

FIG. 4 shows an example method 400 for obtaining gravitational acceleration of a stationary object (e.g., the object 100) according to the present disclosure. At 404, the method 400 (e.g., the position sensor 208, such as an accelerometer) generates sensor data/measurements. At 408, the method 400 (e.g., the motion filter 228) filters out sensor data corresponding to measurements taken during movement of the object. For example, the filtered sensor data is stored in a first in first out (FIFO) buffer.

At 412, the method 400 (e.g., the GCE module 232) defines or identifies a first measurement set of the sensor data. For example, the first measurement set corresponds to sensor data indicating a gravitational acceleration within a predetermined range of (e.g., less than or greater than) a norm of gravity. At 416, the method 400 (e.g., the GCE module 232) defines a second measurement set of the sensor data. For example, the GCE module 232 identifies a cluster of sensor measurements that are within a predetermined threshold angle and magnitude of one another. The cluster of sensor measurements may be identified using a technique such as K-means clustering or other suitable techniques.

As one example, the GCE module 232 selects a sensor measurement (e.g., an oldest sensor measurement stored in the buffer) to be used as a cluster seed. The GCE module 232 then identifies other sensor measurements having an angle relative to the cluster seed that is within the predetermined threshold angle and magnitude. In other words, the GCE module 232 identifies which sensor measurements having a corresponding gravitational acceleration within a clustered three-dimensional area (e.g., such as the region 316).

At 420, the method 400 (e.g., the GCE module 232) determines whether a number of the sensor measurements that are in both the first and second measurement set is greater than a cluster threshold. In other words, the GCE module 232 determines a number of the sensor measurements (e.g., a cluster number) that are both in the clustered area and within the predetermined range of the norm of gravity is greater than the cluster threshold. If true, the method 400 continues to 424. If false, the method 400 continues to 404 to continue to collect sensor data. In this manner, the method 400 continues to collect sensor data until a cluster of sensor measurements indicating a long-term stationary position can be identified.

At 424, the method 400 (e.g., the GCE module 232) calculates a stationary gravitational acceleration based on the sensor measurements in the clustered area. For example, the GCE module 232 calculates a representative value of the gravitational acceleration for all the sensor measurements within the clustered area. For example, the representative value may correspond to an average value, a median value, a minimum mean square error (MMSE) value, etc. The representative value of the gravitational acceleration within the clustered area represents long-term, stationary gravitational acceleration.

At 428, the method 400 (e.g., the GCE module 232 or another component of the sensor module 200) determines whether the calculated gravitational acceleration is valid. For example, the method 400 determines whether the calculated gravitational acceleration has a value that indicates a calculation fault or error, indicates that the lid is open or the object 100 is being moved, etc. Example values that may be invalid include a value that is too large or too small (i.e., above a maximum threshold or below a minimum threshold), a value that indicates that the lid is completely open or the object 100 is overturned or tipped over, etc. If true, the method 400 continues to 432. If false, the method 400 continues to 436. At 436 the method 400 optionally generates an alarm or other indication that may be sent to a user. The alarm may indicate that the object 100 is overturned, the lid is open, etc.

At 432, the method 400 (e.g., the GCE module 232) sets the calculated gravitational acceleration as the stationary, long-term gravitational acceleration of the object 100. The sensor module 200 can then calculate long-term inclination, short-term inclination, and inclination angle of the first component 104 relative to the second component 108, etc. based on the long-term gravitational acceleration.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A sensing system, comprising:
a position sensor configured to generate sensor data indicating a position of an object on a supporting surface, the object having a first component and a second component, wherein the first component is moveable relative to the second component; and
an inclination angle calculation module configured to:
   receive the sensor data;
   calculate an impact of stationary gravitational acceleration on the object based on the sensor data, the impact of the stationary gravitational acceleration including a state in which the object is placed on the supporting surface that is a flat surface and a state in which the object is placed on the supporting surface that is a sloped surface, wherein a direction of gravity is perpendicular to the flat surface, and the direction of gravity is inclined to the sloped surface;
   calculate a long-term inclination of the object using the impact of the stationary gravitational acceleration to generate a first result, wherein the long-term inclination indicates a stationary position of the object with respect to the supporting surface for a predetermined threshold amount of time;
   calculate a short-term inclination of the object using the impact of the stationary gravitational acceleration to generate a second result, wherein the short-term inclination corresponds to a period shorter than the predetermined threshold amount of time; and
   calculate an inclination angle of the first component relative to the second component based on the first and second results,
   wherein the sensing system is configured to generate an alarm to a user based on the first and second results and the inclination angle, and the alarm indicates a state in which the object is overturned or in which the inclination angle is over zero degrees.

2. The sensing system of claim 1, wherein the position sensor is an accelerometer.

3. The sensing system of claim 2, wherein the sensing system includes only a single accelerometer.

4. The sensing system of claim 1, further comprising a level detection sensor configured to sense a level of a material contained within the second component of the object.

5. The sensing system of claim 4, further comprising a communication interface configured to transmit a signal indicating the level of the material contained within the object.

6. The sensing system of claim 5, wherein the communication interface is configured to selectively not transmit the signal based on the inclination angle of the first component relative to the second component.

7. The sensing system of claim 1, wherein the second component is a container and the first component is a lid of the container.

8. The sensing system of claim 7, wherein the container is a trash container.

9. The sensing system of claim 1, wherein the object is a vehicle, the second component is a body of the vehicle, and the first component is a door, a liftgate, or a tailgate of the vehicle.

10. The sensing system of claim 1, further comprising a motion filter configured to filter out the sensor data corresponding to measurements taken by the position sensor during movement of the object.

11. A method, comprising:
generating sensor data indicating a position of an object on a supporting surface, the object having a first component and a second component, wherein the first component is moveable relative to the second component;
calculating an impact of stationary gravitational acceleration on the object based on the sensor data, the impact of the stationary gravitational acceleration including a state in which the object is placed on the supporting surface that is a flat surface and a state in which the object is placed on the supporting surface that is a sloped surface, wherein a direction of gravity is perpendicular to the flat surface, and the direction of gravity is inclined to the sloped surface;
calculating a long-term inclination of the object using the impact of the stationary gravitational acceleration to generate a first result, wherein the long-term inclination indicates a stationary position of the object with respect to the supporting surface for a predetermined threshold amount of time;
calculating a short-term inclination of the object using the impact of the stationary gravitational acceleration to generate a second result, wherein the short-term inclination corresponds to a period shorter than the predetermined threshold amount of time; and
calculating an inclination angle of the first component relative to the second component based on the first and second results,
wherein the sensing system is configured to generate an alarm to a user based on the first and second results and the inclination angle, and the alarm indicates a state in which the object is overturned or in which the inclination angle is over zero degrees.

12. The method of claim 11, further comprising generating the sensor data using an accelerometer.

13. The method of claim 12, further comprising generating the sensor data using only a single accelerometer.

14. The method of claim 11, further comprising sensing a level of a material contained within the second component of the object.

15. The method of claim 14, further comprising transmitting a signal indicating the level of the material contained within the object.

16. The method of claim 15, further comprising selectively not transmitting the signal based on the inclination angle of the first component relative to the second component.

17. The method of claim 11, wherein the second component is a container and the first component is a lid of the container.

18. The method of claim 17, wherein the container is a trash container.

19. The method of claim 11, wherein the object is a vehicle, the second component is a body of the vehicle, and the first component is a door, a liftgate, or a tailgate of the vehicle.

20. The method of claim 11, further comprising filtering out the sensor data corresponding to measurements taken during movement of the object.

* * * * *